United States Patent [19]

Kemp

[11] 4,160,460
[45] Jul. 10, 1979

[54] FIRE-SAFE VALVE STRUCTURE

[75] Inventor: Willard E. Kemp, Houston, Tex.

[73] Assignee: ACF Industries, Incorporated, New York, N.Y.

[21] Appl. No.: 823,787

[22] Filed: Aug. 11, 1977

[51] Int. Cl.² .............................................. F16K 5/06
[52] U.S. Cl. .................................... 137/72; 251/315; 251/328
[58] Field of Search .............................. 137/67, 72–77, 137/457; 251/170, 315

[56] References Cited

U.S. PATENT DOCUMENTS

| | | | |
|---|---|---|---|
| 3,174,495 | 3/1965 | Anderson et al. | 137/74 |
| 3,177,887 | 4/1965 | Priese | 137/74 |
| 3,843,091 | 10/1974 | Gachot | 251/315 |
| 4,105,040 | 8/1978 | Chester | 137/72 |

Primary Examiner—William R. Cline
Assistant Examiner—Richard Gerard
Attorney, Agent, or Firm—Eugene N. Riddle

[57] ABSTRACT

A fire-safe valve structure has a metal seat with an annular groove therein in which a resilient sealing ring is positioned in face-to-face contact with a valve member movable between open and closed positions. The annular groove has an annular space behind the resilient sealing ring to permit displacement of the sealing ring. A fusible material which melts at a predetermined high temperature is associated with the annular space and holds the sealing ring in contact with the valve member. Upon melting of the fusible material and subsequent metering thrugh a metering opening, the sealing ring is displaced within the annular space and the valve member moves into a tight metal-to-metal contact with the metal seat.

16 Claims, 7 Drawing Figures

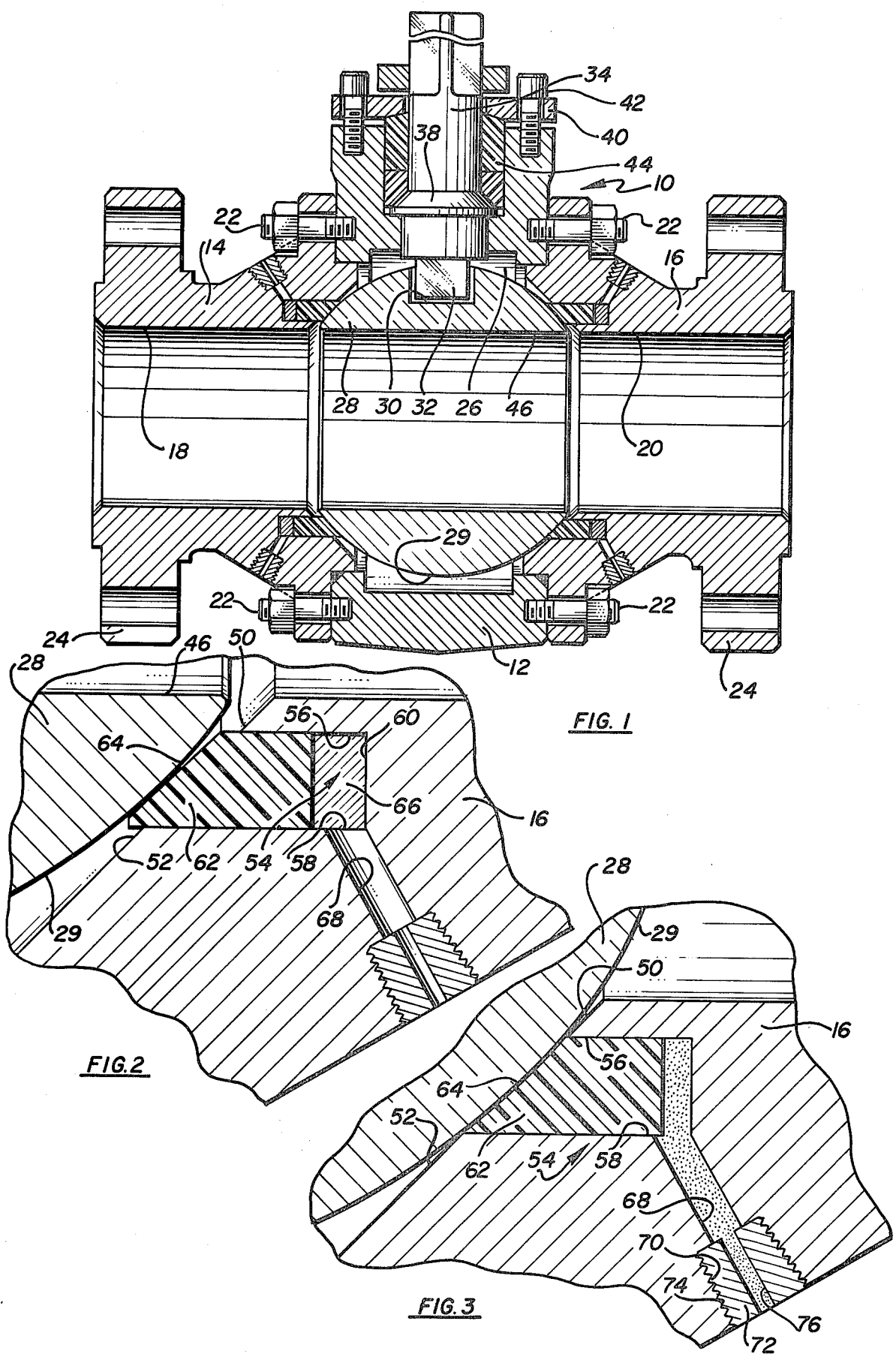

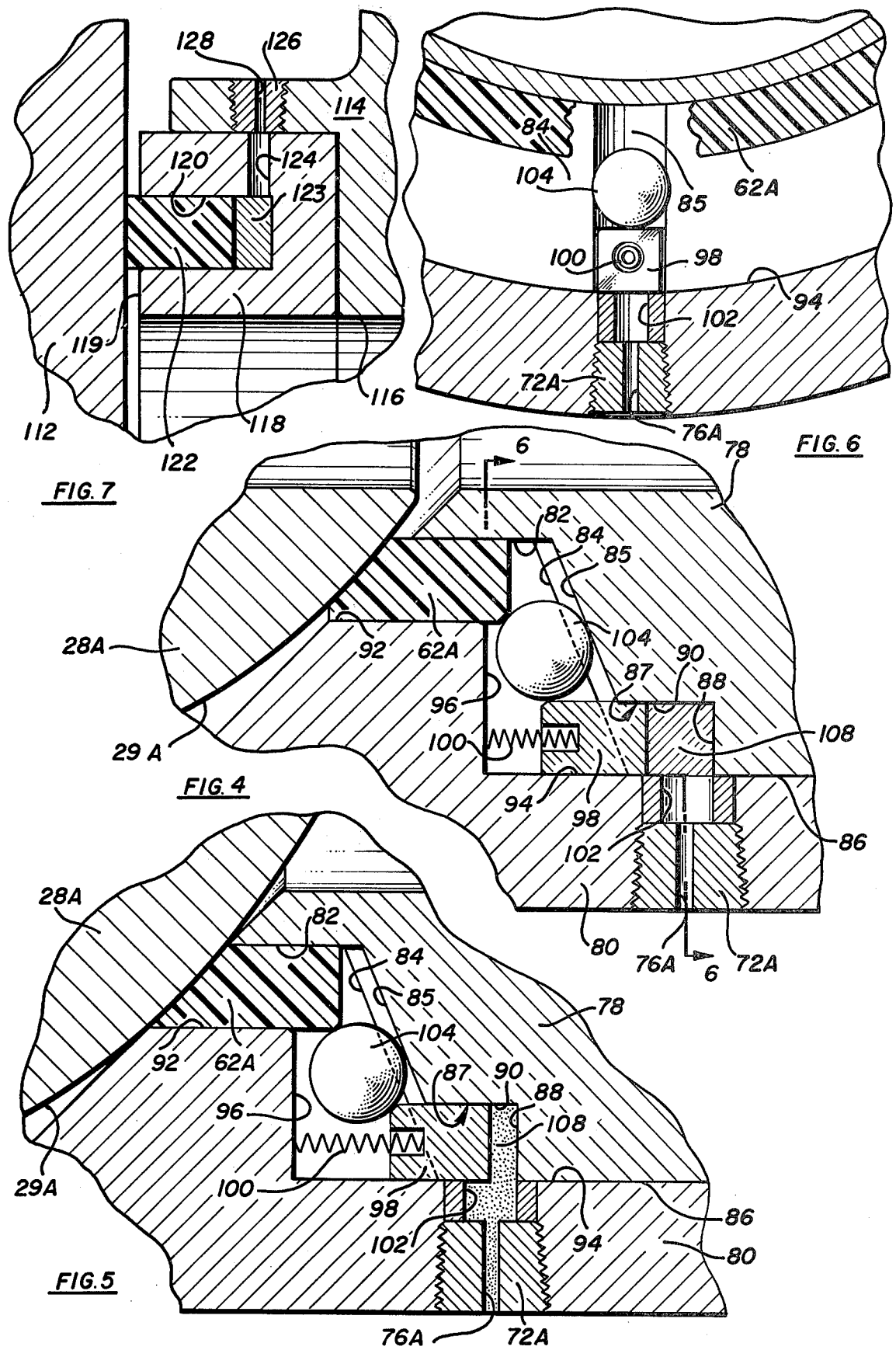

FIRE-SAFE VALVE STRUCTURE

BACKGROUND OF THE INVENTION

This invention relates to a valve structure having a movable valve member controlling fluid flow through a fluid passage and designed particularly for resistance to high temperatures and being subjected to fire.

With safety becoming of increasing importance, the employment of valves which do not fail or leak when subjected to fire is highly desirable. In pipelines which convey inflammable fluids such as petroleum products, valves must be tightly sealed in a closed position and in the event of fire, the valve member must be tightly sealed even though the valve seals might be destroyed or impaired.

Heretofore, so-called fire-safe valve structures have been provided in which the valve seals in contact with a movable valve member, such as a ball valve member, have deteriorated or been partially consumed by high temperatures and the ball valve then moves into metal-to-metal contact with the adjacent metal seat. The prior art devices depended on the resilient face seal for the movable valve member deteriorating or being destructed by the fire or high temperatures. For example, prior U.S. Pat. No. 3,174,495 dated Mar. 23, 1965 discloses a fire-safe ball valve in which a ball valve structure is provided with a resilient sealing member which disintegrates or is consumed during a fire. In addition, U.S. Pat. No. 3,174,495 discloses a fusible material provided adjacent the trunnions of the ball valve with the fusible material disintegrating at high temperatures to permit movement of the spherical valve member into contact with the metal seat.

U.S. Pat. No. 3,843,091 dated Oct. 22, 1974 shows an arrangement in which a resilient face seal formed of polytetrafluoroethylene has a void space behind it to permit flow of the face seal into the void space upon softening of the face seal by a fire thereby to permit a metal-to-metal contact between the movable valve member and the adjacent metallic seat.

BRIEF DESCRIPTION OF THE PRESENT INVENTION

The present invention is directed to a fire-safe valve structure having a valve body with a valve member mounted within the valve chamber, an annular metallic seat about the flow passage with the seat having an annular groove facing the valve member, and a resilient sealing ring mounted in the groove to form a face seal with the groove having a space behind the sealing ring so that the sealing ring may displace within the space. The annular space in which the resilient sealing ring may displace is associated with a fusible material which prevents displacement of the sealing ring until the fusible material melts and is metered through a metering opening. Upon melting of the fusible material, the annular space behind the sealing ring is available to receive the sealing ring and upon displacement of the sealing ring a tight metal-to-metal contact is provided between the valve member and the metal seat.

In one embodiment of the invention the fusible material is subject only to the controlled force of a spring in the valve body and the thrust of the valve member applied against the resilient sealing ring is not transmitted to the fusible material. This eliminates the possibility of any unexpected long term "creep" of the fusible material which is formed of an alloy. In this embodiment, a latch is provided between the fusible material and the resilient sealing ring and prevents any displacement of the resilient sealing ring until the fusible material has melted at which time the latch members forming the latch move laterally outwardly to permit the resilient sealing ring to displace into the space behind the resilient sealing ring for permitting metal-to-metal contact of the valve member with the metallic seat even though the resilient sealing element does not disintegrate or become partially consumed by the high temperatures generated by fire or the like. The temperature at which the fusible material melts to permit contact of the valve member with the metal seat may be closely controlled by the present invention and is not dependent on the particular type or thickness of material which might be employed as the resilient sealing ring in the valve structure.

The invention accordingly comprises a construction hereinafter described, the scope of the invention being indicated in the following claims.

In the accompanying drawings in which several of various possible embodiments of the invention are illustrated, FIG. 1 is a sectional view of one embodiment of the invention comprising a ball valve structure having a fusible material in a groove behind the resilient sealing ring forming the face seal;

FIG. 2 is an enlarged fragment of FIG. 1 showing the face seal in contact with the adjacent ball valve member with a fusible material behind the face seal;

FIG. 3 is an enlarged view similar to FIG. 2 but showing the ball valve member in metal-to-metal sealing contact with the associated metal seat after the fusible material has melted and the face seal has been displaced into the space in the groove which was previously occupied by the fusible material;

FIG. 4 is a section of another embodiment of this invention in which the fusible material is subject only to a constant spring force and a latch member holds the face seal in contact with the ball valve member;

FIG. 5 is a section of the embodiment shown in FIG. 4 but illustrating the ball valve member in a metal-to-metal sealing contact with the metal seat after the fusible material has melted at a relatively high temperature and the latch member has moved laterally to release the face seal for displacement;

FIG. 6 is a section taken generally along the line 6—6 of FIG. 4 and showing the arrangement of the latch member and the fusible material associated therewith; and FIG. 7 is an enlarged section of another embodiment of the invention illustrating a gate valve structure in combination with the face seal and associated fusible material.

Referring now to the drawings and more particularly to the embodiment shown in FIGS. 1–3, a ball valve structure is indicated generally at 10 and comprises a body formed from a main body portion 12 and respective inlet and outlet end body portions 14 and 16. Inlet and outlet end portions 14 and 16 form respective inlet and outlet flow passages 18 and 20. Studs 22 connect main body portion 12 to end body portions 14 and 16. Flanges 24 are formed on the ends of end body portions 18 and 20 and are adapted for bolting to a pipeline or the like. A valve chamber 26 is formed by main body portion 12 between end body portions 18 and 20 and a ball valve member 28 having a spherical outer surface 29 is mounted therein.

Ball valve member 28 has a rectangular slot 30 therein and an elongated end 32 of a stem 34 fits within slot 30. A suitable handle or the like is secured to stem 34 for rotating ball valve member 28 between open and closed positions relative to flow passages 18 and 20. A flow passage 36 extends through ball valve member 28 and is adapted to align with flow passages 18 and 20 in the open position of ball valve member 28. Stem 34 has a flange 38 thereon and a bonnet 40 is secured to the upper end of main body portion 12 by suitable studs 42. A suitable seal and packing combination 44 is positioned between stem 34 and body portion 12.

End body portions 14 and 16 are generally identical and for purposes of illustration, only end body member 16 is described in detail it being understood that end body member 14 is arranged in a similar manner. Body portion 16 provides a metal seat adapted to engage spherical surface 29 of ball valve member 28 upon displacement of a seal ring 62 which forms a face seal for valve member 28. The metal seat is comprised of an inner seat portion 50 and an outer seat portion 52 on opposite sides of an annular groove indicated generally at 54. Groove 54 is defined by inner and outer circumferential walls 56 and 58 which are connected by a bottom wall 60. Resilient seal ring 62 is positioned in groove 54 and is formed of a resilient elastomeric material, such as, for example, polytetrafluoroethylene. Seal ring 62 has a face 64 which is normally in contact with spherical surface 29 of ball valve member 28 to provide a sealing contact therewith. As shown in FIG. 2, an annular space 66 is formed in groove 54 behind seal ring 62 when seal ring 62 is in sealing contact with ball valve member 28. An elongated port 68 extends from annular space 66 to a position outside end portion 16. An outer enlarged end 70 of elongated port 68 is internally threaded. A plug 72 having external screw threads 74 is threaded within enlarged end 70. Plug 72 has a small diameter opening 76 extending therethrough to form a metering opening. Space 66 forms a material chamber which contains a eutectic material which may preferably be an alloy such as bismuth and tin. The melting temperature of the eutectic may be within the range of 150° F. to 450° F. For example, if an alloy is employed containing 40% bismuth and 60% tin, the eutectic material has a yield temperature of around 300° F. and would commence melting or creeping at around 280° F. Opening 76 may be an optimum of around 3/64 inch but may range between 1/64 inch to ¼ inch when an alloy containing 40% bismuth and 60% tin is employed. Opening 76 is of a sufficiently small diameter to prevent the cold extrusion of the fusible eutectic material and the diameter of opening 76 will determine the reaction time required for the fusible material to flow from space 66 after the predetermined temperature is reached. The temperature at which the eutectic material fails may be varied depending on such factors as, for example, the specific alloy employed, the time the alloy is exposed to the temperature, and the rate of increase in the temperature. It is to be understood that an alloy of tin and bismuth is selected to accommodate the difference in temperature between the outside temperature and the temperature in the material or eutectic chamber formed at 66. The term "fusible material" as employed herein is interpreted as a material or substance which changes from a solid state to a liquid state upon reaching a predetermined high temperature. Thus, when the predetermined temperature is reached and the fusible material melts and flows through metering opening 76 and plug 72, seal ring 62 moves within the space as shown in FIG. 3 with ball valve member 28 in a closed position and in metal-to-metal contact with the adjacent metal seat portions 50 and 52 to form a tight metal seal. This arrangement will occur whether or not seal ring 62 deteriorates or is consumed by fire or the like.

Referring now to the embodiment shown in FIGS. 4–6, any thrust or force resulting from ball valve member 28A against resilient seal ring 62A is not transmitted to the fusible material. Thus, undesirable "creep" is eliminated. In the arrangement shown in FIGS. 4–6, the metal seat for ball valve member 28A includes an annular inner seat portion 78 and an outer seat portion 80 which are press fitted together. Inner seat portion 78 forms a side wall 82 and a connecting inclined annular bottom wall 84. Bottom wall 84 has a plurality of grooves 85. Seat portion 78 has an outer circumferential surface 86 and a plurality of slots 87 are spaced about circumferential surface 86 in alignment with grooves 85 and communicating with grooves 85. Each slot 87 defines a bottom 88 and a side 90. Outer seat portion 80 has a front wall 92 which extends in parallel relation to wall 82 on inner seat portion 78 to define a groove to receive resilient seal ring 62A. A rear wall 94 of outer seat portion 78 is in contact with the outer circumferential wall 86 of inner seat portion 78 and a connecting wall 96 extends between front wall 92 and rear wall 94. Mounted in the space between seat portion 78 and seat portion 80 and within each slot 87 is a piston 98 urged by a spring 100 toward bottom 88 of the associated slot 87. An elongated port 102 extends from slot 87 outwardly through outer seat portion 80 to the outside. A plug 72A has a metering opening 76A therein for metering of fusible material 108 adjacent piston 98. A ball 104 fits in a groove 85 and is urged along the inclined groove by seal ring 62A. Plug 72A is similar to plug 72 in the embodiment of FIGS. 1–3. In operation, upon melting of the fusible material and metering of fusible material from metering opening 76A, spring 100 urges piston 98 outwardly into the space formed by the fusible material to permit movement of ball 104 along associated groove 85 which allows displacement of sealing ring 62A.

Referring now to FIG. 7, the present invention is shown in combination with a gate valve structure in which a gate valve member indicated at 112 is mounted for reciprocation between open and closed position. A gate valve body shown at 114 has a flow passage at 116 and is countersunk to form a seat pocket for receiving a seat ring shown at 118. Seat ring 118 has a front face 119 and an annular groove 120 therein to receive annular face seal 122 which engages the adjacent face of gate valve member 112. Groove 120 has an annular space 123 therein behind face seal 122 and fusible material is provided in such space. An elongated port 124 extends from annular space 123 and a plug 126 having a metering opening 128 is provided adjacent the outlet end of elongated port 124. Plug 126 is similar to plug 72 in the embodiment shown in FIGS. 1–3. As in the other embodiments, the melting of the fusible material results in the displacement of face seal 122 and metal-to-metal contact between face 119 of metal seat ring 118 and the adjacent face of gate member 112.

What is claimed is:
1. A fire-safe valve structure comprising:
   a valve body having a flow passage therethrough and a valve chamber, a valve member mounted within the valve chamber movable between open and closed positions relative to said flow passage; an annular metallic seat about the flow passage having an annular groove facing the adjacent valve member, a sealing ring mounted in the annular groove for contacting the adjacent valve member in sealing relation to provide a face seal, said annular groove having a space therein behind the sealing ring to permit displacement of the sealing ring, a fusible material chamber associated with said space; and a fusible material in said fusible material chamber adapted to melt at a predetermined high temperature, means mounting said valve member and associated sealing ring for limited displacement toward the fusible material, and passage relieving means for the fusible material chamber to permit the fusible material to flow therein after melting, said fusible material upon reaching a predetermined high temperature melting and flowing from the material chamber to permit displacement of the sealing ring and valve member whereby said valve member contacts the adjacent metallic seat to provide a tight metal-to-metal seal between the valve member and the seat upon reaching said predetermined high temperature.

2. A fire-safe valve structure as set forth in claim 1 wherein said fusible material chamber is separate from the space behind the sealing ring, and a laterally movable latch member is positioned between the fusible material chamber and the annular groove to releasably hold the sealing ring in sealing contact with the valve member, said latch member being released upon melting of said fusible material to permit displacement of the sealing ring.

3. A fire-safe valve as set forth in claim 1 wherein said valve member is a gate valve member mounted for reciprocal movement between open and closed positions.

4. A fire-safe valve as set forth in claim 1 wherein said valve member is a ball valve member mounted for rotative movement between open and closed positions.

5. A fire-safe valve as set forth in claim 1 wherein said passage relieving means comprises an elongate port which communicates with said fusible material chamber and defines a metering opening, said metering opening having a diameter between around 1/64 inch and ¼ inch.

6. A fire-safe valve as set forth in claim 1 wherein said fusible material is a eutectic material which melts at a temperature over around 150° F.

7. A fire-safe valve as set forth in claim 1 wherein said fusible material chamber is formed by the space behind the sealing ring.

8. A fire-safe valve structure comprising:

a valve body having a valve chamber with inlet and outlet flow passages communicating therewith, a valve member mounted within the valve chamber movable between open and closed positions relative to said flow passages, an annular metallic seat about each flow passage each having an annular groove facing the adjacent valve member, a sealing ring mounted in each annular groove and adapted to contact the adjacent valve member in sealing contact relation, each annular groove having a space therein behind the annular sealing ring to permit displacement of the sealing ring, a fusible material positioned in said space and being in contact with a rear face of the sealing ring, means permitting said valve member and associated sealing ring to displace toward the metallic seat, and means adjacent said space to permit the fusible material to flow therein after melting, said fusible material upon reaching a predetermined high temperature melting and flowing from said space to permit displacement of the sealing ring and valve member whereby said valve member contacts the adjacent metallic seat to provide a tight metal-to-metal seal between the valve member and the seat upon reaching said predetermined high temperature.

9. A fire-safe valve structure comprising:

a valve body having a flow passage therethrough and a valve member mounted within the valve chamber movable between open and closed positions relative to said flow passage, an annular metallic seat about the flow passage having an annular groove facing the adjacent valve member, a resilient sealing ring mounted in the annular groove and adapted to contact the adjacent valve member in sealing contact relation, said annular groove having a space therein behind the sealing ring to permit displacement of the sealing ring, a fusible material chamber adjacent the space behind the sealing ring, a fusible material in said fusible material chamber adapted to melt at a predetermined high temperature, means mounting said valve member and associated sealing ring for limited displacement toward the fusible material, and passage relieving means for the fusible material chamber to permit the fusible material to flow therein after melting, and a laterally movable latch member positioned between the fusible material chamber and the rear face of the resilient sealing ring to releasably hold the sealing ring in sealing contact with the valve member, said latch member being released upon melting of said fusible material to permit displacement of the sealing ring, whereby said valve member contacts the adjacent metallic seat to provide a tight metal-to-metal seal between the valve member and the seat upon reaching said predetermined high temperature.

10. A fire-safe valve structure as set forth in claim 9 wherein a piston is positioned in the fusible material chamber against the fusible material, and a spring urges continuously the piston against the fusible material, said latch member comprising a ball between and in contact with said piston and the rear face of the sealing ring, said ball being released for lateral movement upon movement of the piston under the bias of the spring.

11. A valve structure comprising:

a valve body having a flow passage and a valve chamber, a valve member mounted within the valve chamber movable between open and closed positions relative to said flow passage, a generally rigid annular seat about the flow passage having an annular space adjacent the valve member, a sealing ring mounted in the annular space for contacting the adjacent valve member in sealing relation to provide a face seal, said annular space being of sufficient dimensions to permit displacement of the sealing ring, a fusible material chamber associated with said space;

a fusible material in said fusible material chamber, means permitting said valve member and associated sealing ring to displace toward the generally rigid seat, and means adjacent the fusible material chamber to permit the fusible material to flow therein after melting, said fusible material upon reaching a predetermined high temperature displacing from the material chamber to permit displacement of the sealing ring and valve member whereby said valve member contacts the adjacent generally rigid seat to provide a seal between the valve member and the generally rigid seat upon reaching said predetermined high temperature.

12. A valve structure as set forth in claim 11 wherein said valve member is a gate valve member mounted for reciprocal movement between open and closed positions.

13. A valve structure as set forth in claim 11 wherein said valve member is a ball valve member mounted for rotative movement between open and closed position.

14. A valve structure as set forth in claim 11 wherein said means adjacent the fusible material chamber comprises an elongate port communicating with said fusible material chamber and defining a metering opening, said metering opening having a diameter between around 1/64 and ¼ inch.

15. A valve structure as set forth in claim 11 wherein said fusible material is a eutectic material which melts at a temperature over around 150° F.

16. A valve structure comprising:
a valve body having a flow passage and a valve chamber, a valve member mounted within the valve chamber for limited displacement axially of the flow passage and for movement between open and closed positions relative to said flow passage, an annular metallic seat about the flow passage adjacent the valve member, a resilient sealing ring associated with the seat and normally maintained in contact with the valve member in sealing relation therewith to provide a face seal, an annular space behind the sealing ring of sufficient dimensions to permit displacement of the sealing ring therein, a fusible material chamber in said valve body;

a fusible material in said fusible material chamber, said associated sealing ring displacing with said annular space in response to melting of said fusible material, and a relieving space to receive the fusible material after melting, said fusible material melting upon reaching a predetermined high temperature and flowing into the relieving space to permit displacement of the sealing ring and valve member whereby said valve member contacts the adjacent metal seat to provide a seal therebetween.

* * * * *